US009460071B2

(12) United States Patent
Avasarala et al.

(10) Patent No.: US 9,460,071 B2
(45) Date of Patent: Oct. 4, 2016

(54) RULE DEVELOPMENT FOR NATURAL LANGUAGE PROCESSING OF TEXT

(71) Applicant: SAS Institute Inc., Cary, NC (US)

(72) Inventors: Viswanath Avasarala, Katy, TX (US); David Styles, Cary, NC (US); James Tetterton, Holly Springs, NC (US); Richard Crowell, Braintree, MA (US); Saratendu Sethi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/692,333

(22) Filed: Apr. 21, 2015

(65) Prior Publication Data

US 2016/0078014 A1 Mar. 17, 2016

Related U.S. Application Data

(60) Provisional application No. 62/051,926, filed on Sep. 17, 2014.

(51) Int. Cl.

| | |
|---|---|
| ***G06F 17/27*** | (2006.01) |
| ***G06F 17/20*** | (2006.01) |
| ***G06F 17/24*** | (2006.01) |
| ***G06F 17/30*** | (2006.01) |

(52) U.S. Cl.
CPC ....... *G06F 17/241* (2013.01); *G06F 17/30734* (2013.01)

(58) Field of Classification Search
None
See application file for complete search history.

(56) References Cited

U.S. PATENT DOCUMENTS

| | | | | |
|---|---|---|---|---|
| 6,446,061 | B1 * | 9/2002 | Doerre ................ | G06F 17/3071 707/738 |
| 8,429,179 | B1 | 4/2013 | Mirhaji | |
| 8,494,987 | B2 | 7/2013 | Katukuri et al. | |
| 8,639,678 | B2 | 1/2014 | Somasundaran et al. | |
| 2008/0072134 | A1 * | 3/2008 | Balakrishnan ........ | G06F 17/278 715/230 |
| 2008/0319978 | A1 * | 12/2008 | Brun ..................... | G06F 17/278 |
| 2010/0332583 | A1 * | 12/2010 | Szabo ............... | G06F 17/30522 709/202 |
| 2012/0216114 | A1 * | 8/2012 | Privault .............. | G06F 3/04883 715/702 |
| 2012/0290288 | A1 * | 11/2012 | Ait-Mokhtar ......... | G06F 17/271 704/9 |

(Continued)

FOREIGN PATENT DOCUMENTS

| | | |
|---|---|---|
| WO | WO2013144769 | 10/2013 |

OTHER PUBLICATIONS

Luciano et al., The Translational Medicine Ontology and Knowledge Base: driving personalized medicine by bridging the gap between bench and bedside, Journal of Biomedical Semantics 2011 2(Suppl 2):S1, May 17, 2011.

(Continued)

*Primary Examiner* — Marcus T Riley
(74) *Attorney, Agent, or Firm* — Bell & Manning, LLC

(57) ABSTRACT

In a computing device that defines a rule for natural language processing of text, annotated text is selected from a first document of a plurality of annotated documents. An entity rule type is selected from a plurality of entity rule types. An argument of the selected entity rule type is identified. A value for the identified argument is randomly selected based on the selected annotated text to generate a rule instance. The generated rule instance is applied to remaining documents of the plurality of annotated documents. A rule performance measure is computed based on application of the generated rule instance. The generated rule instance and the computed rule performance measure are stored for application to other documents.

30 Claims, 10 Drawing Sheets

(56) References Cited

U.S. PATENT DOCUMENTS

| | | | |
|---|---|---|---|
| 2013/0073316 A1 | 3/2013 | Miglietta et al. | |
| 2013/0096944 A1 | 4/2013 | Shah et al. | |
| 2014/0046696 A1 | 2/2014 | Higgins et al. | |
| 2015/0127323 A1 * | 5/2015 | Jacquet | G06F 17/271 704/9 |

OTHER PUBLICATIONS

Halgrim et al., A cascade of classifiers for extracting medication information from discharge summaries, Journal of Biomedical Semantics 2011 2(Suppl 3):S2, Jul. 14, 2011.

Abacha et al., Automatic extraction of semantic relations between medical entities: a rule based approach, Journal of Biomedical Semantics 2011 2(Suppl 5):S4, Oct. 6, 2011.

Doulaverakis et al., Panacea, a semantic-enabled drug recommendations discovery framework, Journal of Biomedical Semantics 2014 5:13, Mar. 6, 2014.

SAS Institute Inc. 2012. SAS® Enterprise Content Categorization 12.1: User's Guide. Cary, NC: SAS Institute Inc.

SAS Institute Inc. 2012. SAS® Content Categorization Studio 12.1: User's Guide. Cary, NC: SAS Institute Inc.

Categorizing and Tagging Words, Downloaded from http://www.nltk.org/book/ch05.html on Nov. 4, 2014, pp. 1-27.

Extracting Information from Text, Downloaded from http://www.nltk.org/book/ch07.html on Nov. 4, 2014, pp. 1-23.

Finkel et al., Incorporating Non-local Information into Information Extraction Systems by Gibbs Sampling, Proceedings of the 43rd Annual Meeting of the ACL, Ann Arbor, Jun. 2005, pp. 363-370.

Neff et al., Acquiring Lexical Data From Machine-Readable Dictionary Resources for Machine Translation, In Third International Conference on Theoretical and Methodological Issues in Machine Translation of Natural Languages, 1990, pp. 85-90.

Kung et al., On Finding the Maxima of a Set of Vectors, Journal of the Association for Computing Machinery, vol. 22, No. 4, Oct. 1975, pp. 469-476.

D. Goldberg, Genetic Algorithms in Search, Optimization and Machine Learning, Reading, MA: Addison-Wesley Professional, 1989, Chapter 6 Introduction to Genetics-Based Machine Learning, pp. 229-256.

D. Goldberg, Genetic Algorithms in Search, Optimization and Machine Learning, Reading, MA: Addison-Wesley Professional, 1989, Chapter 5 Advanced Operators and Techniques in Genetic Search, pp. 197-201.

* cited by examiner

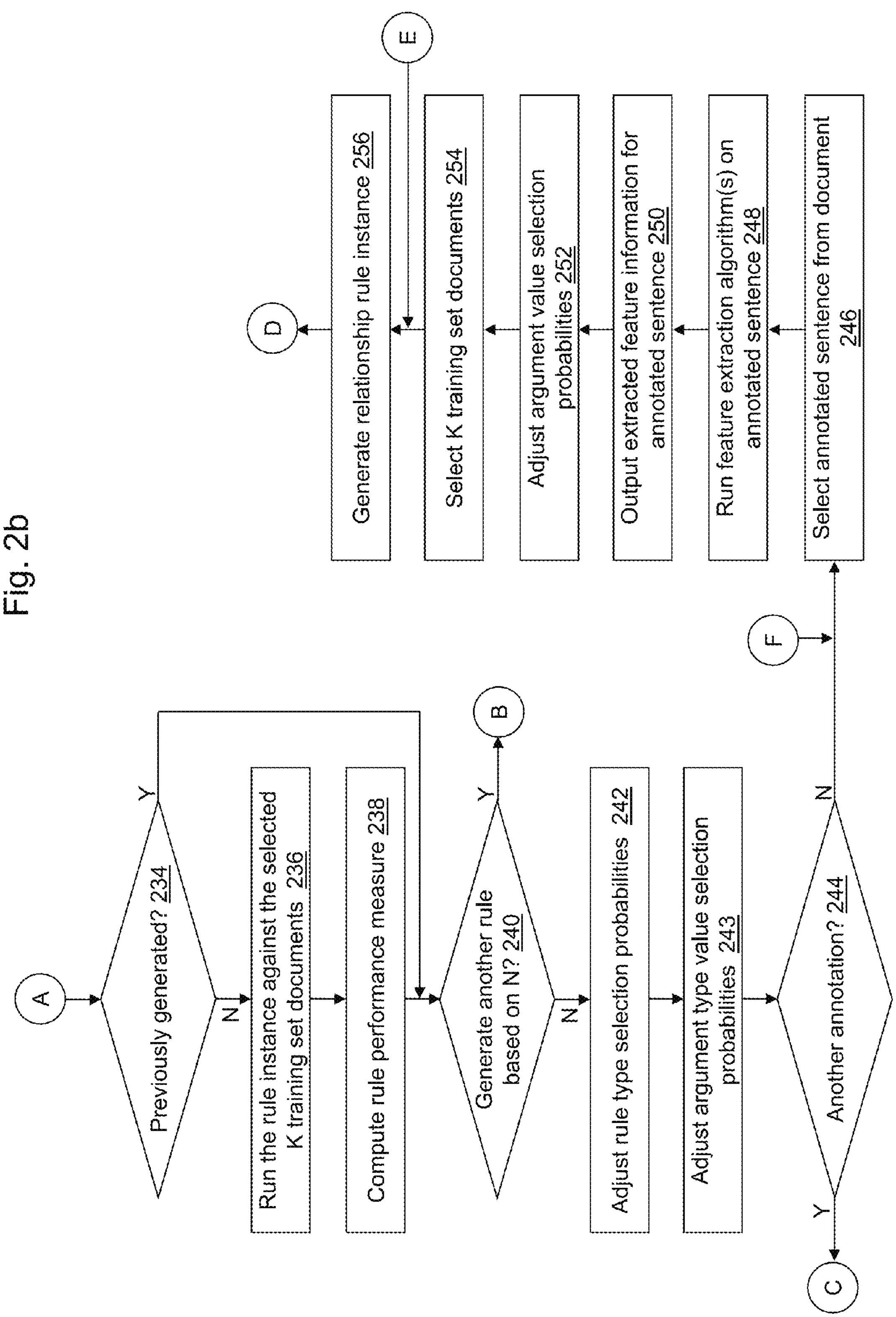
Fig. 2b
A
Previously generated? 234
Y
N
Run the rule instance against the selected K training set documents 236
Compute rule performance measure 238
Generate another rule based on N? 240
Y
B
N
Adjust rule type selection probabilities 242
Adjust argument type value selection probabilities 243
Another annotation? 244
Y
C
N
F
Select annotated sentence from document 246
Run feature extraction algorithm(s) on annotated sentence 248
Output extracted feature information for annotated sentence 250
Adjust argument value selection probabilities 252
Select K training set documents 254
E
Generate relationship rule instance 256
D

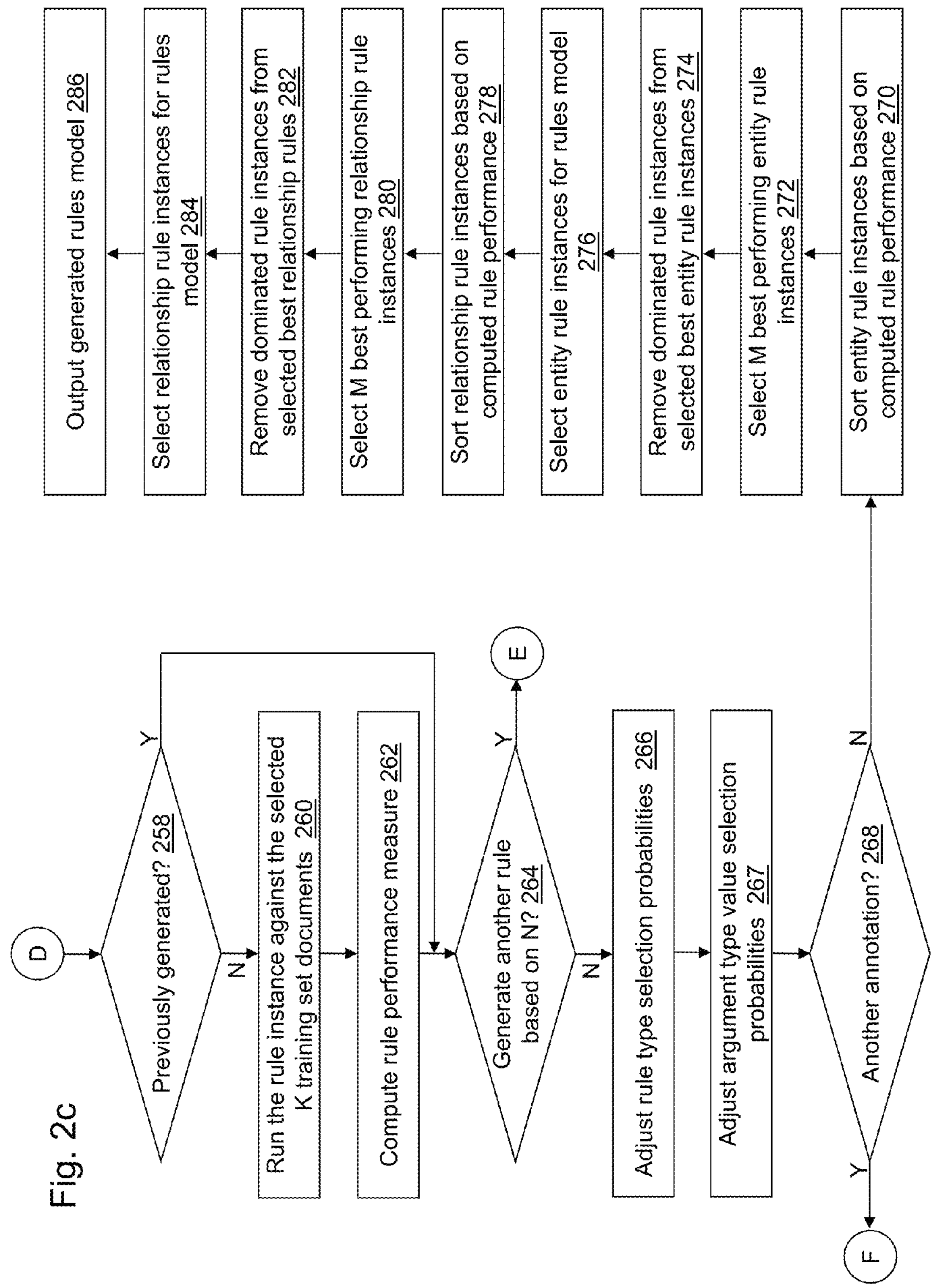
Fig. 2c
D
Previously generated? 258
Y
N
Run the rule instance against the selected K training set documents 260
Compute rule performance measure 262
Generate another rule based on N? 264
Y
E
N
Adjust rule type selection probabilities 266
Adjust argument type value selection probabilities 267
Another annotation? 268
Y
F
N
Sort entity rule instances based on computed rule performance 270
Select M best performing entity rule instances 272
Remove dominated rule instances from selected best entity rule instances 274
Select entity rule instances for rules model 276
Sort relationship rule instances based on computed rule performance 278
Select M best performing relationship rule instances 280
Remove dominated rule instances from selected best relationship rules 282
Select relationship rule instances for rules model 284
Output generated rules model 286

RULE DEVELOPMENT FOR NATURAL LANGUAGE PROCESSING OF TEXT

CROSS-REFERENCE TO RELATED APPLICATIONS

The present application claims the benefit of priority of 35 U.S.C. §119(e) to U.S. Provisional Patent Application No. 62/051,926, filed on Sep. 17, 2014, the entire contents of which are hereby incorporated by reference.

BACKGROUND

Natural language processing (NLP) involves the development of rules to enable computers to derive meaning from human or natural language input.

SUMMARY

In an example embodiment, a computing device is provided that defines a rule for natural language processing of text. The computing device includes, but is not limited to, a processor and a computer-readable medium operably coupled to the processor. The computer-readable medium has instructions stored thereon that, when executed by the processor, cause the computing device to define a rule for natural language processing of text. Annotated text is selected from a first document of a plurality of annotated documents. An entity rule type is selected from a plurality of entity rule types. An argument of the selected entity rule type is identified. A value for the identified argument is randomly selected based on the selected annotated text to generate a rule instance. The generated rule instance is applied to remaining documents of the plurality of annotated documents. A rule performance measure is computed based on application of the generated rule instance. The generated rule instance and the computed rule performance measure are stored for application to other documents.

In another example embodiment, a computer-readable medium is provided having stored thereon computer-readable instructions that when executed by a computing device, cause the computing device to define a rule for natural language processing of text. Annotated text is selected from a first document of a plurality of annotated documents. An entity rule type is selected from a plurality of entity rule types. An argument of the selected entity rule type is identified. A value for the identified argument is randomly selected based on the selected annotated text to generate a rule instance. The generated rule instance is applied to remaining documents of the plurality of annotated documents. A rule performance measure is computed based on application of the generated rule instance. The generated rule instance and the computed rule performance measure are stored for application to other documents.

In yet another example embodiment, a method of defining a rule for natural language processing of text is provided. In the method performed by a computing device, annotated text is selected from a first document of a plurality of annotated documents. An entity rule type is selected from a plurality of entity rule types. An argument of the selected entity rule type is identified. A value for the identified argument is randomly selected based on the selected annotated text to generate a rule instance. The generated rule instance is applied to remaining documents of the plurality of annotated documents. A rule performance measure is computed based on application of the generated rule instance. The generated rule instance and the computed rule performance measure are stored for application to other documents.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2*a*, 2*b*, and 2*c* depict a flow diagram illustrating examples of operations performed by the rule development device of FIG. 1 in accordance with an illustrative embodiment.

DETAILED DESCRIPTION

Figure 1:
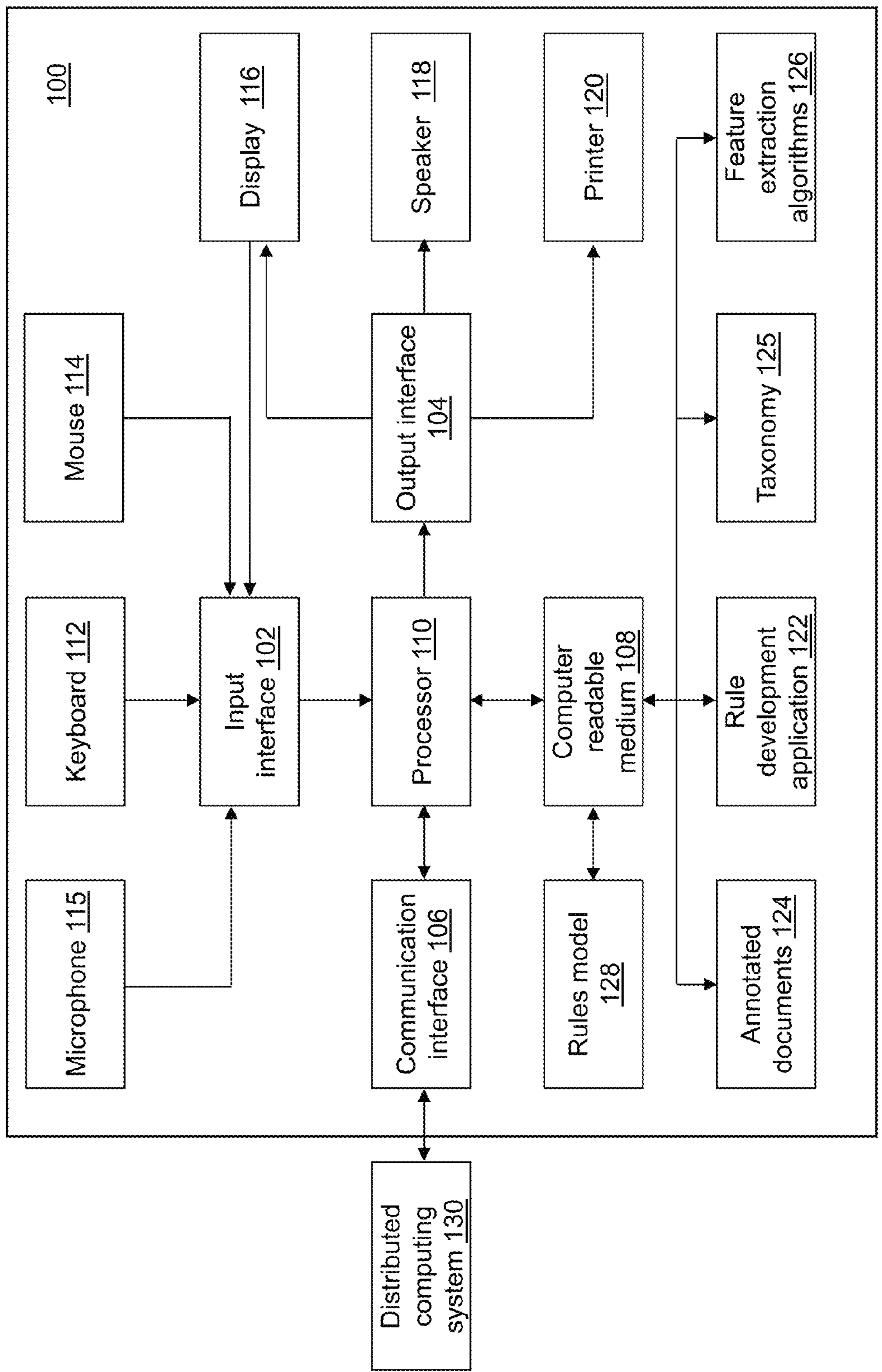
FIG. 1 depicts a block diagram of a rule development device in accordance with an illustrative embodiment.

Referring to FIG. 1, a block diagram of a rule development device 100 is shown in accordance with an illustrative embodiment. Rule development device 100 may include an input interface 102, an output interface 104, a communication interface 106, a non-transitory computer-readable medium 108, a processor 110, a rule development application 122, annotated documents 124, a taxonomy 125, one or more feature extraction algorithms 126, and a rules model 128. Rule development application 122 creates and trains rules model 128 to extract entities and relationships between the entities from unstructured data using the annotated documents 124. Taxonomy 125 is applied when the annotated documents 124 are annotated. Rule development application 122 may apply feature extraction algorithms 126 to the annotated documents 124 to provide additional information related to the annotated documents 124 as part of creating and training rules model 128 as discussed further below. Fewer, different, and/or additional components may be incorporated into rule development device 100.

Input interface 102 provides an interface for receiving information from the user for entry into rule development device 100 as understood by those skilled in the art. Input interface 102 may interface with various input technologies including, but not limited to, a keyboard 112, a mouse 114, a microphone 115, a display 116, a track ball, a keypad, one or more buttons, etc. to allow the user to enter information into rule development device 100 or to make selections presented in a user interface displayed on the display. The same interface may support both input interface 102 and output interface 104. For example, display 116 comprising a touch screen provides user input and presents output to the user. Rule development device 100 may have one or more input interfaces that use the same or a different input interface technology. The input interface technology further may be accessible by rule development device 100 through communication interface 106.

Output interface 104 provides an interface for outputting information for review by a user of rule development device 100 and/or for use by another device or application. For example, output interface 104 may interface with various output technologies including, but not limited to, display 116, a speaker 118, a printer 120, etc. Rule development device 100 may have one or more output interfaces that use the same or a different output interface technology. The output interface technology further may be accessible by rule development device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Rule development device 100 may have one or more communication interfaces that use the same or a different communication interface technology. For example, rule development device 100 may support communication using an Ethernet port, a Bluetooth antenna, a telephone jack, a USB port, etc. Data and messages may be transferred between rule development device 100 and distributed computing systems 130 using communication interface 106 as discussed further below.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Rule development device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Rule development device 100 also may have one or more drives that support the loading of a memory media such as a CD, DVD, an external hard drive, etc. One or more external hard drives further may be connected to rule development device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Rule development device 100 may include a plurality of processors that use the same or a different processing technology.

Rule development application 122 performs operations associated with creating and training rules model 128 using data stored in the annotated documents 124. Feature extraction algorithms 126 may be used to perform various natural language processing (NLP) functions on the annotated documents 124. The created rules model 128 may be used to automatically identify entities and relationships between the entities in text. Some or all of the operations described herein may be embodied in rule development application 122. The operations may be implemented using hardware, firmware, software, or any combination of these methods. Referring to the example embodiment of FIG. 1, rule development application 122 is implemented in software (comprised of computer-readable and/or computer-executable instructions) stored in computer-readable medium 108 and accessible by processor 110 for execution of the instructions that embody the operations of rule development application 122. Rule development application 122 may be written using one or more programming languages, assembly languages, scripting languages, etc.

Rule development application 122 may be implemented as a Web application. For example, rule development application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 2A:
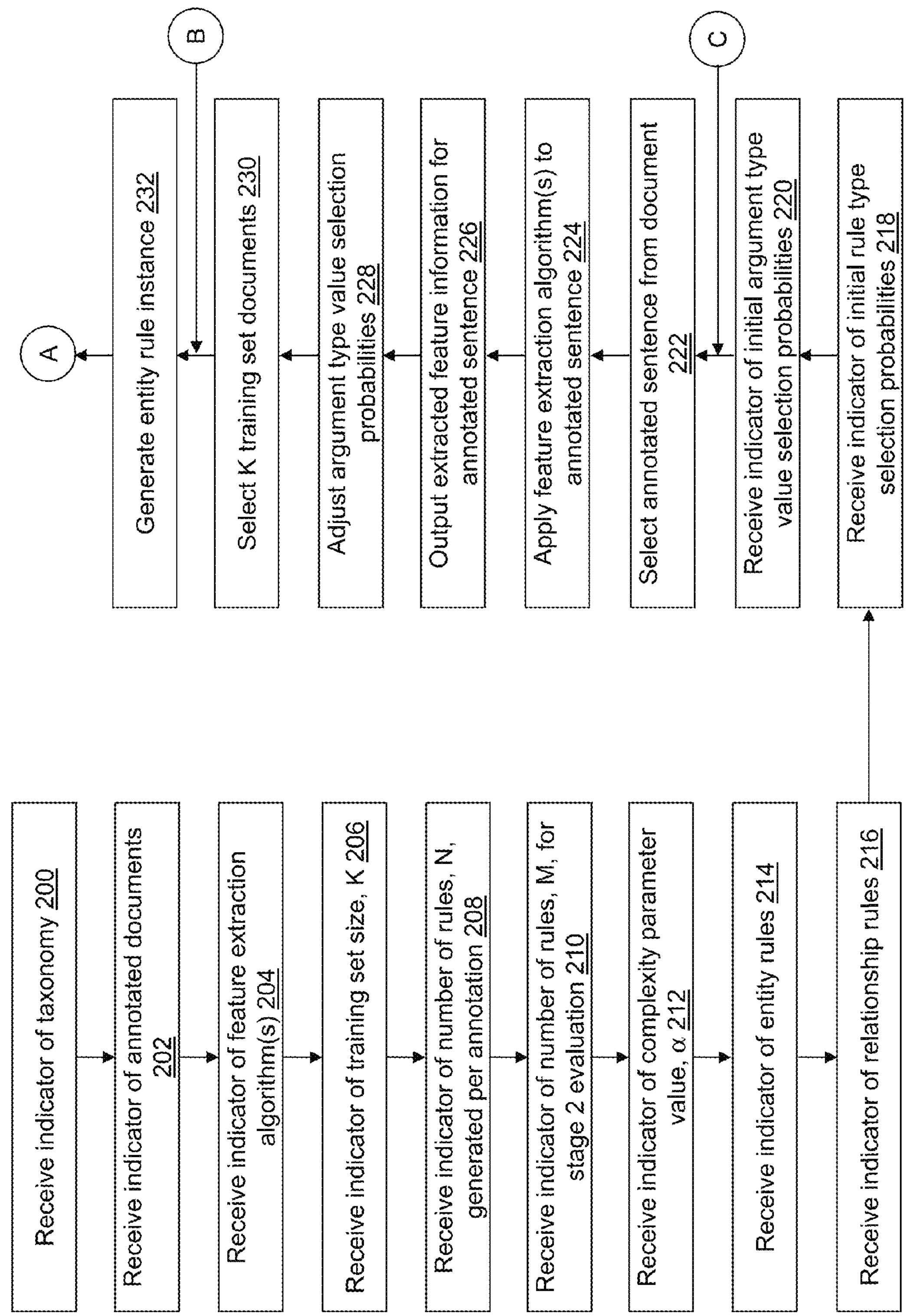

Referring to FIGS. **2*a*-2*c*, example operations associated with rule development application 122 are described. Additional, fewer, or different operations may be performed depending on the embodiment. The order of presentation of the operations of FIGS. 2*a*-2*c* is not intended to be limiting. Although some of the operational flows are presented in sequence, the various operations may be performed in various repetitions, concurrently (in parallel, for example, using threads), and/or in other orders than those that are illustrated. For example, a user may execute rule development application 122, which causes presentation of a first user interface window, which may include a plurality of menus and selectors such as drop down menus, buttons, text boxes, hyperlinks, etc. associated with rule development application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by rule development application 122**.

Referring to FIG. 2*a*, in an operation 200, a first indicator is received that indicates taxonomy 125. For example, the first indicator indicates a location of taxonomy 125. As an example, the first indicator may be received by rule development application 122 after selection from a user interface window or after entry by a user into a user interface window. In an alternative embodiment, taxonomy 125 may not be selectable. For example, a default taxonomy or a most recently created taxonomy may be used automatically as taxonomy 125.

Taxonomy 125 organizes a classification structure. For example, taxonomy 125 describes entities and a relationship between entities that are of interest to a user. Entities may be information units like names, including a person, an organization, a location name, an object name, etc. and numeric expressions including time, date, money, percent expressions, etc. Entities can be organized in a hierarchy with specialized entities having a "sub-class" relationship with their parent entity. For example, a "politician" entity may be a sub-class of a "person" entity because every "politician" is also a "person". Similarly, a "senator" entity may be a sub-class of the "politician" entity.

Figure 3:
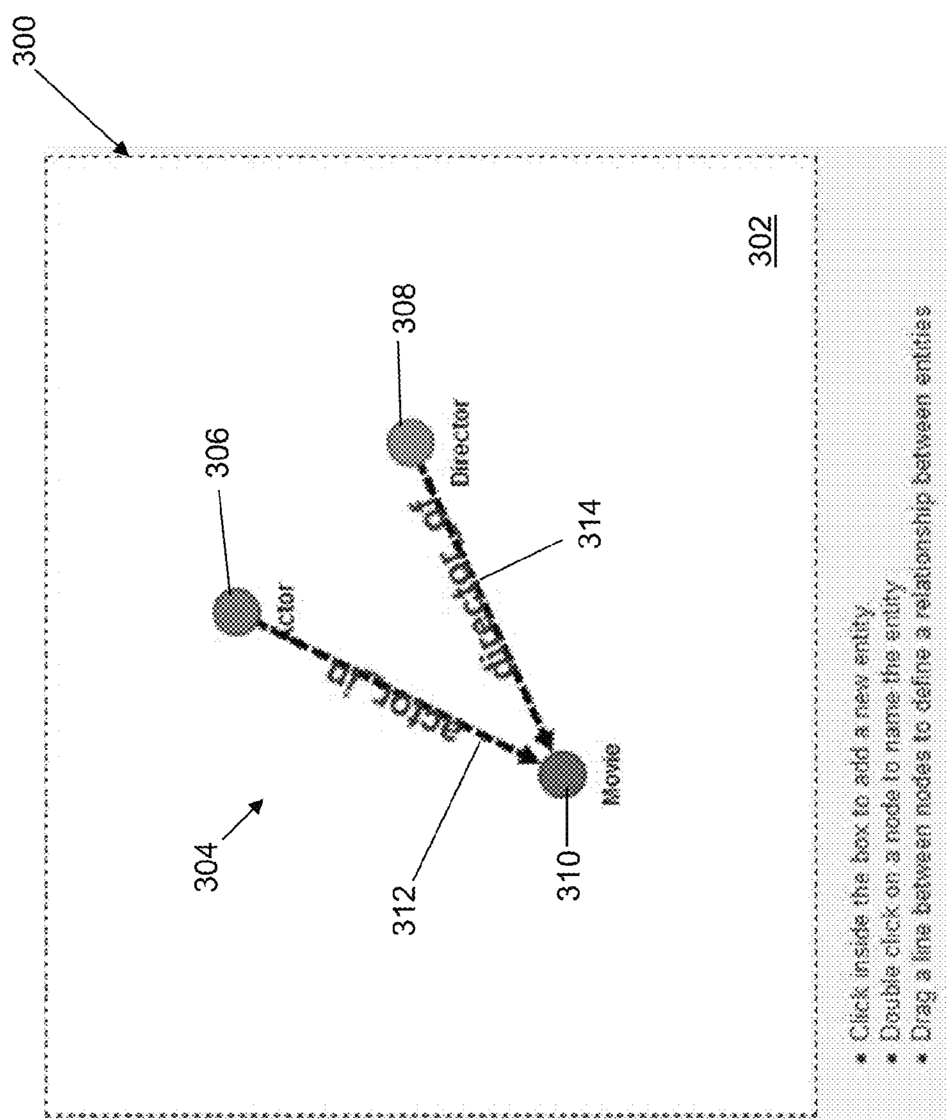
FIG. 3 illustrates a taxonomy creation window created under control of a rule development application of the rule development device of FIG. 1 in accordance with an illustrative embodiment.

For further illustration, referring to FIG. 3, a taxonomy creation window 300 is shown in accordance with an illustrative embodiment. Taxonomy creation window 300 may include a palette 302 within which a user may graphically define taxonomy 125, which may be saved, for example, to a storage location on computer-readable medium 108. In operation 200, an indicator of the storage location may be received after a user selects the storage location, or the indicator may be received after a user indicates completion of the taxonomy creation process using taxonomy creation window 300.

A taxonomy tree 304 may be created in palette 302. In the illustrative embodiment, taxonomy tree 304 may include a first entity node 306, a second entity node 308, a third entity node 310, a first relationship edge 312, and a second relationship edge 314. First entity node 306 may be identified as an actor node; second entity node 308 may be identified as a director node; and third entity node 310 may be identified as a movie node. First relationship edge 312 identifies a relationship "actor in" between first entity node 306 and third entity node 310. Second relationship edge 314 identifies a relationship "director of" between second entity node 308 and third entity node 310.

Taxonomy 125, for example, defined by taxonomy tree 304, may include any number of entity nodes and relationship edges defining any types of entities and relationships between them. Taxonomy 125 may be represented in any computer-readable format such as binary, alphanumeric, numeric, symbol, string, markup language, etc.

Taxonomy 125 may be created previously by the same or a different user. Example taxonomies may be created for specific subject matter areas as understood by a person of skill in the art. For example, any of a financial taxonomy, a security taxonomy, a patent taxonomy, a biomedical taxonomy, etc. may be defined and/or selected as taxonomy 125.

Referring again to FIG. 2*a*, in an operation 202, a second indicator is received that indicates the annotated documents 124. For example, the second indicator indicates a location of the annotated documents 124. As an example, the second indicator may be received by rule development application 122 after selection from a user interface window or after entry by a user into a user interface window. In an alternative embodiment, the annotated documents 124 may not be selectable. For example, documents stored in a default location may be used automatically as the annotated documents 124.

Figure 4:
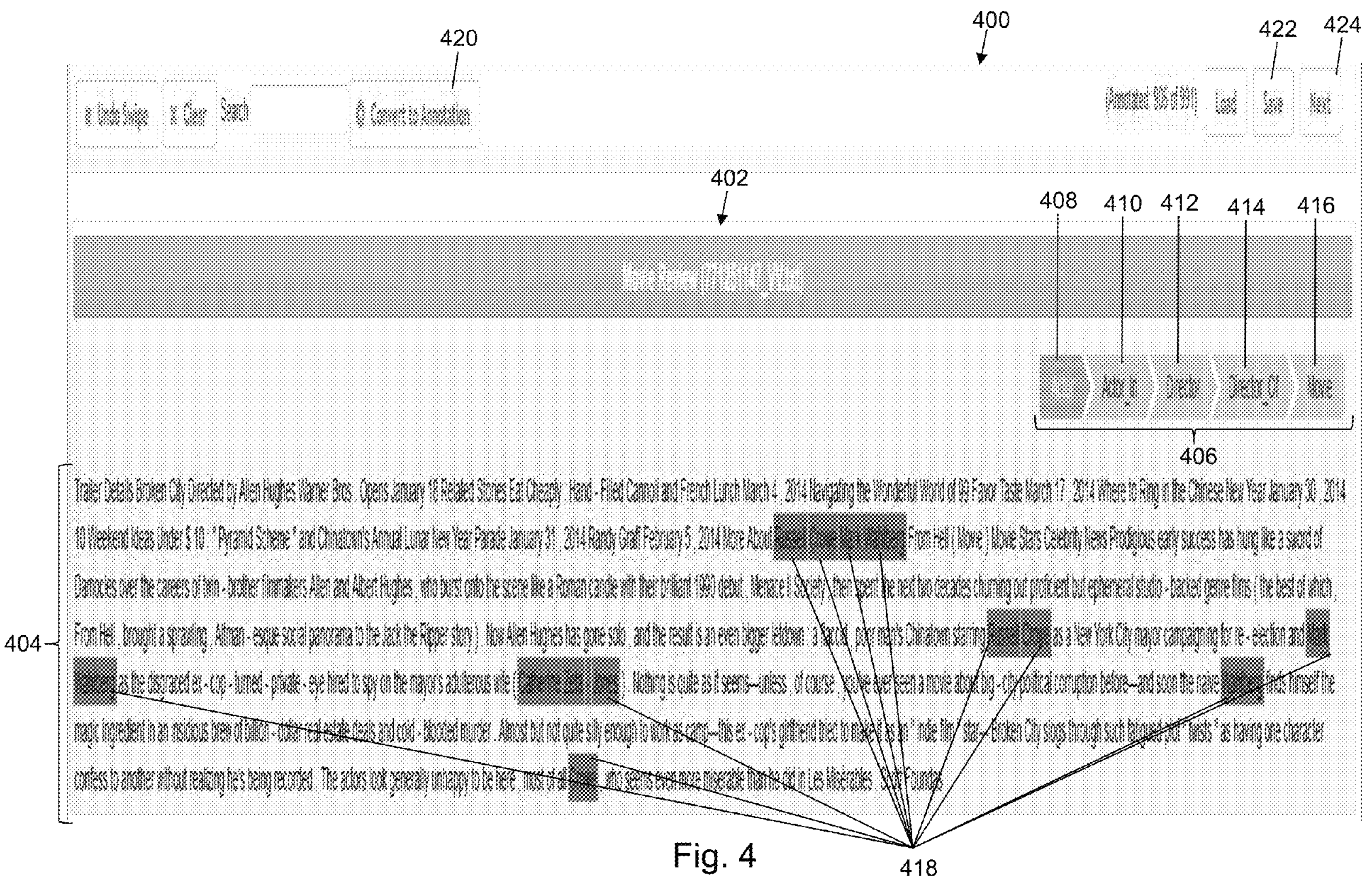
FIG. 4 illustrates an annotation window created under control of the rule development application of the rule development device of FIG. 1 in accordance with an illustrative embodiment.

For further illustration, referring to FIG. 4, an annotation window 400 is shown in accordance with an illustrative embodiment. Annotation window 400 may include an annotation palette 402, a convert button 420, a save button 422, and a next button 424. Annotation palette 402 may include text 404 and a taxonomy ribbon 406. Text 404 may be stored in a document and may include one or more pages with any number of characters. Taxonomy ribbon 406 may include a first taxonomy item descriptor 408, a second taxonomy item descriptor 410, a third taxonomy item descriptor 412, a fourth taxonomy item descriptor 414, and a fifth taxonomy item descriptor 416. For example, first taxonomy item descriptor 408 indicates "actor" for first entity node 306 of taxonomy tree 304; second taxonomy item descriptor 410 indicates "actor in" for first relationship edge 312 of taxonomy tree 304; third taxonomy item descriptor 412 indicates "director" for second entity node 308 of taxonomy tree 304; fourth taxonomy item descriptor 414 indicates "director of" for second relationship edge 314 of taxonomy tree 304; and fifth taxonomy item descriptor 416 indicates "movie" for third entity node 310 of taxonomy tree 304.

A user may select one of first taxonomy item descriptor 408, second taxonomy item descriptor 410, third taxonomy item descriptor 412, fourth taxonomy item descriptor 414, or fifth taxonomy item descriptor 416 and identify entities/relationships in text 404 that match the context of the selected taxonomy item descriptor. For example, in the illustrative embodiment, first taxonomy item descriptor 408 has been selected (as indicated by highlighting in taxonomy ribbon 406), and the user has selected annotated words 418 (as indicated by highlighting in annotation text 404) from text 404 that match the context of "actor". The user identifies words in text 404 associated with each taxonomy item descriptor.

When finished processing text 404, the user may select convert button 420 to convert text 404 to annotated text. The user may select save button 422 to save the annotated text in an annotated document of the annotated documents 124. The annotated document may be stored in computer-readable medium 108. The annotated document further may be stored on a computer-readable medium on one or more other computing devices, such as those included in distributed computing system 130, and accessed using communication interface 106. The annotated document may include any number of words that each may include one or more characters in any format such as numeric, alphabetic, and symbol. Each document need not be saved in a separate file. For example, a document may be a single page of text included in a file. The user may select next button 424 to open a next document to annotate in annotation palette 402.

The annotated documents 124 may be stored using various formats as known to those skilled in the art including a file system, a relational database, a system of tables, a structured query language database, etc. For example, the annotated documents 124 may be stored in a cube distributed across a grid of computers as understood by a person of skill in the art. As another example, the annotated documents 124 may be stored in a multi-node Hadoop® cluster, as understood by a person of skill in the art. Apache™ Hadoop® is an open-source software framework for distributed computing supported by the Apache Software Foundation. As another example, the annotated documents 124 may be stored in a cloud of computers and accessed using cloud computing technologies, as understood by a person of skill in the art. The SAS® LASR™ Analytic Server developed and provided by SAS Institute Inc. of Cary, N.C., USA may be used as an analytic platform to enable multiple users to concurrently access the annotated documents 124.

Referring again to FIG. 2*a*, in an operation 204, a third indicator is received that indicates the one or more feature extraction algorithms 126 to apply as part of natural language processing of the annotated documents 124. For example, the third indicator indicates a name of the one or more feature extraction algorithms 126. The third indicator may be received by rule development application 122 after selection from a user interface window or after entry by a user into a user interface window. A default value for the one or more feature extraction algorithms 126 to apply may further be stored, for example, in computer-readable medium 108. As an example, a feature extraction algorithm may be selected from a "part-of-speech (POS) Tagger", a "negation handler", a "common entity identifier", a "co-reference resolver", a "sentence boundary identifier", a "stop word extractor", etc. The feature extraction algorithm may be labeled or selected in a variety of different manners by the user as understood by a person of skill in the art. The one or more feature extraction algorithms 126 may be written using one or more programming languages, assembly languages, scripting languages, etc.

In an operation 206, a fourth indicator of a training set size, K, is received. For example, the fourth indicator indicates a value of K, a number of documents of the annotated documents 124 to use when creating and training rules model 128. The fourth indicator may be received by rule development application 122 after selection from a user interface window or after entry by a user into a user interface window. A default value for the training set size, K, further may be stored, for example, in computer-readable medium 108. Merely for illustration, K may be defined as 900.

In an operation 208, a fifth indicator of a number of rules, N, is received. For example, the fifth indicator indicates a value of N, a number of rules generated for each annotation in the annotated documents 124 when creating and training rules model 128. The fifth indicator may be received by rule development application 122 after selection from a user interface window or after entry by a user into a user interface window. A default value for the number of rules, N, further may be stored, for example, in computer-readable medium 108. Merely for illustration, N may be defined as 10.

In an operation 210, a sixth indicator of a number of rules, M, is received. For example, the sixth indicator indicates a value of M, a number of rules generated for a stage II evaluation when creating and training rules model 128 as discussed further below. The sixth indicator may be received by rule development application 122 after selection from a user interface window or after entry by a user into a user interface window. A default value for the number of rules, M, further may be stored, for example, in computer-readable medium 108. Merely for illustration, M may be defined as 1000.

In an operation 212, a seventh indicator of a complexity parameter, a, is received. For example, the seventh indicator indicates a value of a used during the stage II evaluation when creating and training rules model 128 as discussed further below. The seventh indicator may be received by rule development application 122 after selection from a user interface window or after entry by a user into a user interface window. A default value for the complexity parameter, a, further may be stored, for example, in computer-readable medium 108. Merely for illustration, a may be defined as 0.01.

In an operation 214, an eighth indicator of one or more entity rule types is received. The one or more entity rule types each define a rule structure applied to each annotation when creating and training rules model 128 to identify entities. The eighth indicator may be received by rule development application 122 after selection from a user interface window or after entry by a user into a user interface window. A default value for the one or more entity rule types to apply may further be stored, for example, in computer-readable medium 108. The one or more entity rule types may be labeled or selected in a variety of different manners by the user as understood by a person of skill in the art.

A concept may define an autonomous piece of information such as a movie, a book, a title, etc. A rule refers to a category or a concept definition where the definition can include one or more rules. Example entity rule types include:

A CLASSIFIER rule can include a string as an argument. A match is triggered when the string is found in the text. For example, CLASSIFIER:Ruby matches on any text including the string "Ruby".

A CONCEPT rule can include one or more concepts and one or more strings as arguments. When more than one concept is referenced, a relationship is specified between the matching terms. A match is triggered when the relationship specified between the matching terms is found in the text. For example, the sequence below defines a FULLNAME concept that matches on "Ruby William", "Nancy Pelosi", and "Barack Obama", but not on "Obama Barack":

| Concept Name | Entry |
|---|---|
| FIRSTNAME | CLASSIFIER:Ruby |
| | CLASSIFIER:Nancy |
| | CLASSIFIER:Barack |
| LASTNAME | CLASSIFIER:William |
| | CLASSIFIER:Pelosi |
| | CLASSIFIER:Obama |
| FULLNAME | CONCEPT: FIRSTNAME LASTNAME |

A C_CONCEPT rule includes one or more concepts, one or more strings, one or more tokens, and a context as arguments. Matches occur in the context (_c) specified by the curly braces ("{ }"). A match is triggered when the matching terms are found in the text in the specified context. For example, the sequence below defines a PERSON concept that matches on "President Barack Obama said":

| Concept Name | Entry |
|---|---|
| FIRSTNAME | CLASSIFIER:Ruby |
| | CLASSIFIER:Nancy |
| | CLASSIFIER:Barack |
| LASTNAME | CLASSIFIER:William |
| | CLASSIFIER:Pelosi |
| | CLASSIFIER:Obama |
| TITLE | CLASSIFIER:President |
| PERSON | C_CONCEPT: TITLE _c{FIRSTNAME LASTNAME} said |

A CONCEPT_RULE includes one or more concepts, one or more strings, one or more tokens, a context, and an operator as arguments. A match is triggered when the matching terms are found in the text in the specified context and when the Boolean rule defined by the Boolean operator is matched. For example, the sequence below defines a VACATIONLOCATION concept that matches on "Walt Disney World in Orlando, Fla. is a great place to vacation":

| Concept Name | Entry |
|---|---|
| VACATION | CLASSIFIER:Disney World |
| LOCATION | CLASSIFIER:Florida |
| VACATIONLOCATION | CONCEPT__RULE: RULE:(SENT, "_c{VACATION :Prep _cap :sep LOCATION}", "vacation") |

Predefined concepts shorten the process of writing rules by allowing subsequent rules to reference the predefined concepts such as Person, Organization, Location, etc. To define a specific string to match, the string or concept can be defined within quotation marks (" "). Parentheses ("( )") can be used to group the elements that comprise rule definitions. For example, parentheses may be used with arguments and operators separated by a comma (",") and a space. Curly braces ("{ }") can be used to delimit information that is returned as a match.

Example tokens include:

_w, which returns a match on any word that occurs in the defined position in the document. For example, to match any type of business, the following can be used: C_CONCEPT:_c{COMPANYTYPE}_w.

_cap, which returns a match on any word that begins with an uppercase letter.

_c, which returns a match if the keyword is located within the specified context. For example, to match any COMPANY concept immediately followed by the term New York, the following can be used: C_CONCEPT:_c{COMPANY} New York.

Example operators include:

AND, which specifies that a match can occur only when both arguments are present, somewhere within the text. For example, the following rule limits matches to Bills in text where the word football also occurs: CONCEPT_RULE:(AND, "_c({Bills}", "football")

OR, which specifies that a match is returned if one, but not both, of the arguments is present, somewhere within the document. For example, the following rule matches if either Barack or Obama is present in the text: CONCEPT_RULE:(OR, "_c{Barack}", "_c{Obama}").

ORD, which specifies that a match is returned if the arguments are present in the specified order. For example, the following rule matches if the words dump and truck are present in the text in the specified order: CONCEPT_RULE:(ORD, "_c{dump}", "truck").

DISI_n, which specifies that a match is returned if the arguments are present in the text within "n", the specified number of words. The first match may define the starting position and the last match may occur at or before the specified number of words. For example, the following rule matches when a match on the FULLNAME concept appears within eight words of Harvard University: CONCEPT_RULE:(DIST_8, "_c{FULLNAME}", "Harvard University").

ORDDIST_n, which specifies that a match is returned if the arguments are present in the text within "n", the specified number of words and in the specified order. For example, the following rule matches when the POSITION concept is followed by the word "Obama" within 12 words of the match on the POSITION concept: CONCEPT_RULE:(ORDIST_12, "_c{POSITION}", "Obama").

SENT, which specifies that a match is returned when the arguments are present in the same sentence. For example, the following rule matches when the word Amazon and river occur in the same sentence: CONCEPT_RULE:(SENT, "_c{Amazon}", "river").

SENT_n, which specifies that a match is returned when the arguments are present within "n", the specified number of sentences. For example, the following rule matches when the PER concept (PER concept: CLASSIFIER:Obama) and the term "he" occur within two sentences: CONCEPT_RULE:(SENT_2, "_c{PER}", "he"})

SENTSTART_n, which specifies that a match is returned when the arguments are present within "n" word from the beginning of the sentence. For example, the following rule matches when the word Democratic occurs within five words from the start of a sentence: CONCEPT_RULE:(SENTSTART_5, "Democratic").

For illustration, Table I includes four rule structures for four entity rule types that can be applied to each annotation when creating and training rules model 128 to identify entities:

TABLE I

| Rule type number | Structure | Randomly defined arguments |
|---|---|---|
| 1 | C__CONCEPT:*p1* _c{*p0*} | 1) direction, 2) pivot-element (p0), 3) context-element (p1) |
| 2 | CONCEPT__RULE: (ORDDIST__n, "_c{p0}", "*p1*", "p2") | 1) direction, 2) pivot-element-1 (p0), 3) context-element (p1), 4) pivot-element-2 (p2) |
| 3 | CLASSIFIER: *p0* | 1) pivot-element (p0) |
| 4 | CONCEPT__RULE: (SENT, (DIST__n, "_c{*p0*}", "*p1*") | 1) pivot-element (p0), 2) context-element (p1) |

The randomly defined arguments are defined as discussed below to define a specific rule instance. The entity rules defined in Table I are defined using LITI. Additional details describing LITI can be found in the SAS® Enterprise Content Categorization 12.1: User's Guide, Cary, N.C., SAS Institute Inc. 2012. The entity rules may be written using one or more programming languages, assembly languages, scripting languages, etc. as understood by a person of skill in the art. The entity rules may be represented in any computer-readable format such as binary, alphanumeric, numeric, symbol, string, markup language, etc.

In an operation 216, a ninth indicator of one or more relationship rule types is received. The one or more relationship rule types each define a rule structure applied to each annotation when creating and training rules model 128 to identify relationships between entities. The ninth indicator may be received by rule development application 122 after selection from a user interface window or after entry by a user into a user interface window. A default value for the one or more relationship rule types to apply may further be stored, for example, in computer-readable medium 108. Of course, the one or more relationship rules may be labeled or selected in a variety of different manners by the user as understood by a person of skill in the art.

Relationship rule types include at least two arguments. Example relationship rule types include:

A SEQUENCE rule extract facts from text if the facts appear in the order specified. An example SEQUENCE rule is SEQUENCE:(drug,manufacturer): _drug{_cap}_w_w_manufacturer {Wyeth}_w_w treatment. This SEQUENCE rule takes the arguments drug and manufacturer. Inside the parentheses that follow each argument is the concept that identifies a match. To locate the _drug predicate, a word that begins with an uppercase letter is identified that is followed by two words. To match the _manufacturer predicate, "Wyeth" is located followed by two words and the word "treatment". A match is returned when both the _drug predicate and _manufacturer predicate are found in the specified order.

A PREDICATE_RULE rule extract facts from text when a Boolean rule is matched. An example PREDICATE_RULE rule is PREDICATE_RULE:(drug,manufacturer): (DIST_20, "_drug{DrugName}", "_manufacturer{DRUG_COMPANY}", "make"). Like the preceding SEQUENCE rule, this PREDICATE_RULE defines the arguments drug and manufacturer. However, the PREDICATE_RULE uses the DIST operator to specify that a match is returned when the DrugName concept is located within 20 words of a match on the DRUG_COMPANY concept. In addition, a match on the DRUG_MANUFACTURER concept only occurs when the word "make" is located. The words located between matches on the concepts DrugName and DRUG_COMPANY are returned as a matching phrase.

For illustration, Table II includes three rule structures for three relationship rule types that can be applied to each annotation when creating and training rules model 128 to identify relationships between entities:

TABLE II

| Rule type number | Structure | Randomly defined arguments |
|---|---|---|
| 1 | PREDICATE__RULE:(class1,class2): (ORDDIST__n, "__class1{class1}", "*p0*", "__class2{class2}") | direction, pivot-element-1, pivot-element-2, context-element (p0) |
| 2 | PREDICATE__RULE:(class1,class2): (SENT, (DIST__n, "__class1{*p0*}", "__class2{*p1*}") | direction, pivot-element-1 (p0), pivot-element-2 (p1) |
| 3 | SEQUENCE:(class1, class2): __class1{class1} *p0* __class2{class2} | direction, context-element (p0) |

The arguments for the relationship rules are based on combinations of the entities defined by the one or more entity rule types. The randomly defined arguments are defined as discussed below to define a specific rule instance. The relationship rules defined in Table II are defined using LITI though the relationship rules may be written using one or more programming languages, assembly languages, scripting languages, etc. as understood by a person of skill in the art. The relationship rules may be represented in any computer-readable format such as binary, alphanumeric, numeric, symbol, string, markup language, etc.

In an operation 218, a tenth indicator of initial rule type selection probabilities associated with each entity rule type and each relationship rule type is received. For example, the tenth indicator indicates an initial probability for selecting each entity rule type and for selecting each relationship rule type. The initial probabilities for selecting each entity rule type should sum to one, and the initial probabilities for selecting each relationship rule type should sum to one. The tenth indicator may be received by rule development application 122 after selection from a user interface window or after entry by a user into a user interface window. A default value for the initial probability for selecting each entity rule type may be determined as 1/NER, where NER is a number of the entity rule types. A default value for the initial probability for selecting each relationship rule type may be determined as 1/NRR, where NRR is a number of the relationship rule types.

In an operation 220, an eleventh indicator of initial argument type value selection probabilities associated with each optional value for each randomly defined argument type is received. The initial probabilities for choosing each optional value for each randomly defined argument type is received should sum to one. The eleventh indicator may be received by rule development application 122 after selection from a user interface window or after entry by a user into a user interface window. A default value for the initial probability of choosing each optional value for each randomly defined argument type may be determined as 1/NRP, where NRP is a number of optional values of the associated randomly defined argument type. Other default values may be defined. Probabilities may further be uniquely defined for each argument type for each entity rule type and each relationship rule type.

The optional values that are selectable for each argument type associated with an entity rule or a relationship rule may be predefined, for example, by a user. For example, Table III below shows example optional values for each parameter type included in the entity rules of Table I and the relationship rules of Table II:

TABLE III

| Randomly defined argument type | List of optional values |
|---|---|
| pivot-element | singular proper noun, word, person |
| context-element | POS tag {singular proper noun, verb, adverb, adjective, noun} and/or Concept tag {set of concepts in the taxonomy} |
| direction | {left, right} |
| class | Concept and associated list of concept entities (e.g., a concept named "Actor" followed by a list of known actors) |

A probability of 0.5 may be initialized for a left direction argument value and 0.5 for a right direction argument value for the direction randomly defined argument type. A probability of 0.333 may be initialized for a singular proper noun argument value, 0.333 may be initialized for a -w argument value, and 0.333 may be initialized for a person argument value for the pivot-element randomly defined argument type. A probability of 0.2 may be initialized for a singular proper noun argument value, 0.2 may be initialized for a verb argument value, 0.2 may be initialized for an adverb argument value, 0.2 may be initialized for an adjective argument value, and 0.2 may be initialized for a noun argument value for the context-element randomly defined argument type. A user may elect to change the initial probabilities. For example, the user may change the probability initialized for the left direction argument value to 0.2, and the probability initialized for the right direction argument value to 0.8.

Use of the POS tag or the Concept tag may be by random selection or may be based on knowledge of a specific language sentence structure. The context-element may be selected different depending on the rule and whether the POS tag and/or the concept tag is used as summarized in Table IV:

TABLE IV

| Structure | Randomly defined arguments |
|---|---|
| C_CONCEPT:*p1* _c{*p0*} | If POS tag, use phrase until and including the first occurrence of the tag. If Concept tag, use phrase until the first occurrence of tag, then replace the word that matches the concept with the name of the concept. |
| CONCEPT_RULE: (ORDDIST_n, "_c{p0}", "*p1*", "p2") | If POS tag, use word (the first occurrence of the tag). If Concept tag, use the name of the concept. |
| CONCEPT_RULE: (SENT, (DIST_n, "_c{*p0*}", "*p1*") | If POS tag, use word (the first occurrence of the tag). If Concept tag, use the name of the concept. |
| PREDICATE_RULE:(class1,class2): (ORDDIST_n, "_class1{class1}", "*p0*", "_class2{class2}") | If POS tag, use word (the first occurrence of the tag). If Concept tag, use the name of the concept. |
| SEQUENCE:(class1, class2): _class1{class1} *p0* _class2{class2} | If POS tag, use phrase until and including the first occurrence of the tag. If Concept tag, use phrase until the first occurrence of tag, then replace the word that matches the concept with the name of the concept. |

In an operation 222, an annotated sentence is selected from a document of the annotated documents 124. In an operation 224, the one or more feature extraction algorithms 126 indicated in operation 204 are applied to the selected annotated sentence. In an operation 226, feature information extracted from the sentence is output. For example, POS tags may be output with the concepts annotated based on taxonomy 125.

In an operation 228, the argument type value selection probabilities are adjusted based on sentences. For example, let the current probabilities for the pivot-element argument type be 0.4 for person, 0.4 for singular proper noun, and 0.2 for word. If the entity we want to extract from the sentence is recognized as a singular proper noun and a word (default), the probability array is adjusted to redistribute the probability mass from person to the other two elements. The probability distribution becomes 0.0 for person, 0.66 (0.4/0.6) for singular proper noun, and 0.33 (0.2/0.6) for word.

In an operation 230, training set documents are selected from the annotated documents 124. For example, K documents are selected randomly from the annotated documents 124. The K documents may or may not include the document from which the annotated sentence is selected.

Figure 5:
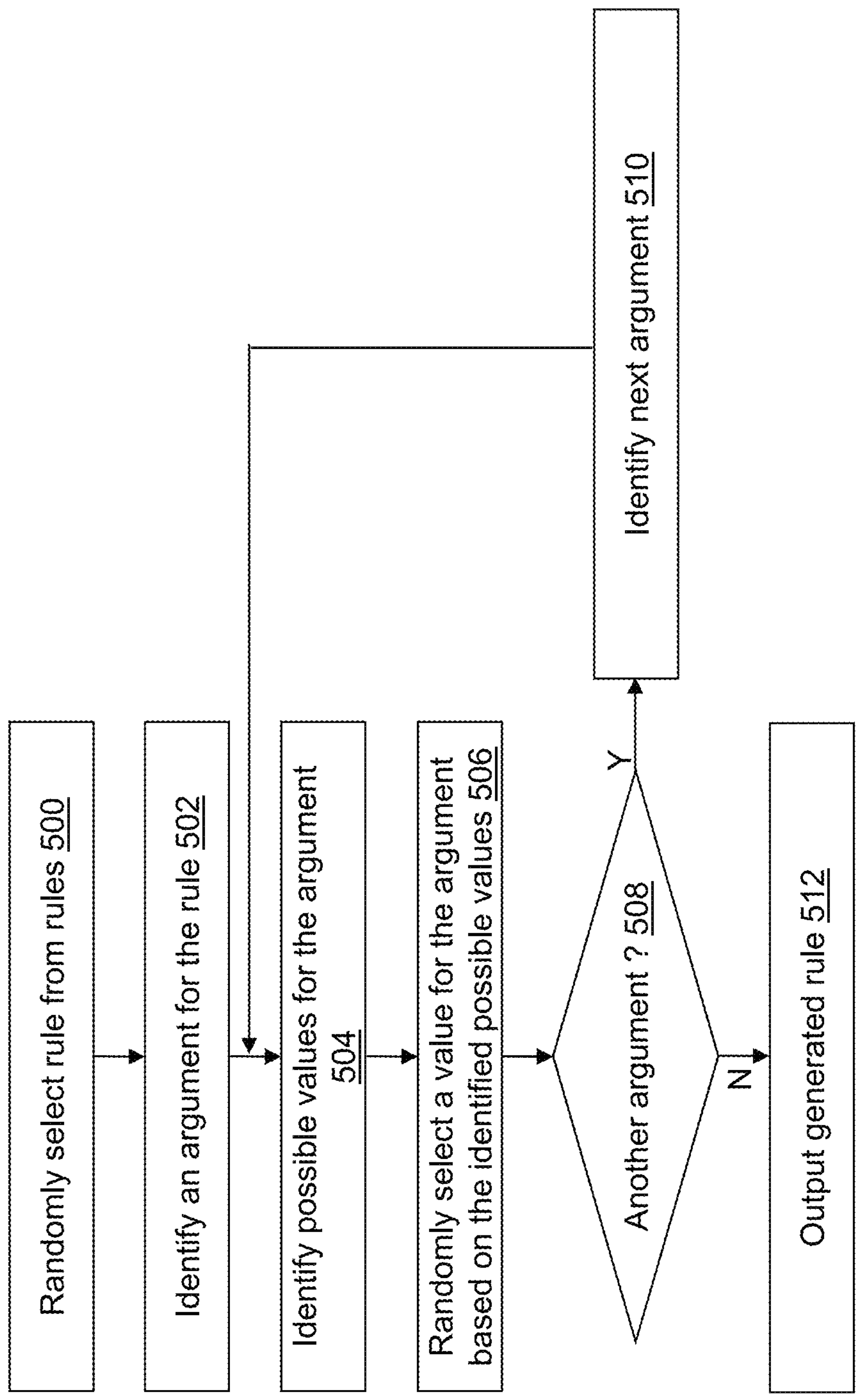
FIG. 5 depicts a flow diagram illustrating additional examples of operations performed by the rule development device of FIG. 1 in accordance with an illustrative embodiment.

In an operation 232, an entity rule instance is generated. A selected entity rule type and selected argument type values together define a rule instance. As an example, the entity rule instance may be generated using example operations described with reference to FIG. 5. The order of presentation of the operations of FIG. 5 is not intended to be limiting, and additional, fewer, or different operations may be performed depending on the embodiment.

In an operation 500, an entity rule of the entity rule types is selected randomly. For example, an entity rule of the four entity rule types defined in Table I is selected using a current selection probability associated with each rule.

In an operation 502, an argument is identified for the selected rule. For example, if entity type rule number 1 is selected (C_CONCEPT:*p1*_c{*p0*}), a first argument is "direction".

In an operation 504, possible values for the selected argument are identified. For example, if the argument is "direction", the possible values may be defined as "left" or "right".

In an operation 506, a value is randomly selected for the selected argument from the identified possible values. For example, the value is selected using a current selection probability associated with the possible values "left" or "right".

In an operation 508, a determination is made concerning whether or not there is another argument to define for the selected rule. When there is another argument to define for the selected rule, processing continues in an operation 510 to generate and evaluate another entity rule. When there is not another argument to define for the selected rule, processing continues in an operation 512.

In operation 510, a next argument for the selected rule is identified and processing continues in operation 504. For example, if entity type rule number 1 is selected (C_CONCEPT:*p1*_c{*p0*}), a next argument is "pivot-element". Processing continues in operation 504 to select a value for the "pivot-element" based on the identified possible values and current selection probabilities associated with the possible values.

In operation 512, the generated rule is output. For example, the generated rule may be output by being stored on one or more devices and/or on computer-readable medium 108 in a variety of formats as understood by a person of skill in the art. As an example, for the annotated sentence "Unlike many of his peers, Tom Cruise can emote well", if entity type rule number 1 is selected, the direction argument is selected as "right", the pivot-element is selected as "person", and the context-element is selected as POS tag verb, the generated rule may be "C_CONCEPT: _c{person} can emote" because the first verb to the right of the entity (Tom Cruise) is "emote". To define "n", a number of words between the terms in the selected annotated sentence may be used in the generated rule.

Referring to FIG. **2*b*, processing continues in an operation 234. In operation 234, a determination is made concerning whether or not the generated rule instance was generated previously for a different annotated sentence. When the generated rule instance was generated previously, processing continues in an operation 240. When the generated rule instance was not generated previously, processing continues in an operation 236**.

In operation 236, the generated rule instance is run against the selected training set documents to identify text that matches the generated rule as understood by a person of skill in the art. In an operation 238, a rule performance measure is computed. For example, a binary classification value such as an $F_1$ score can be computed as a measure of the rule's accuracy. The $F_1$ score considers both a precision p and a recall r to compute the score, where p is a number of correct matching results (as determined based on the annotations) divided by a number of all returned matching results, and r is the number of correct results divided by the number of results that should have been returned (as determined based on the annotations). For example, when searching for "politicians" in a database that has Mr. Obama, Mr. Kobe Bryant, and Ms. Hillary Clinton, if the rule returns Mr. Obama and Mr. Kobe Bryant, precision is 50% because 1 out of 2 results is accurate, and recall is 50% because 1 out of 2 politicians is identified. The $F_1$ score can be interpreted as a weighted average of p and r, where the $F_1$ score is between one (best) and zero (worst). An example, equation for computing the $F_1$ score is $$F_1 = 2 \cdot \frac{p \cdot r}{p + r}.$$

Other statistical performance measures may be computed as understood by a person of skill in the art.

In operation 240, a determination is made concerning whether or not to generate another rule instance based on a comparison between a number of iterations of operation 232 for the selected annotated sentence and the value of N. For illustration, when the number of iterations of operation 232 for the selected annotated sentence is less than or equal to the value of N, the determination is to generate another rule instance. When the determination is to generate another rule instance, processing continues in operation 232 to generate and evaluate another entity rule instance. When the determination is not to generate another rule instance, processing continues in an operation 242.

In operation 242, the rule type selection probabilities are adjusted based on the computed rule performance measure determined for each entity rule type generated at each iteration of 238. For example, the computed rule performance measure is incorporated into an average score that is updated each time a rule is used. For illustration, assuming that each time a first rule type is used, an average computed rule performance measure of 0.1 results and that each time a second rule type is used, an average computed rule performance measure of 0.05 results. Based on this example, the probability of selecting the first rule type is twice the probability of selecting the second rule type. Initially, a uniform probability value may be assigned to each rule type selection probability. At some point, the computed rule performance measure may be used for the rule type selection probabilities. For example, the uniform probability value assigned to each rule type selection probability may be used for a specified portion (e.g., first 100 documents, 20% of documents, etc.) of the annotated documents 124. As another example, after starting with the uniform probability values, a mix of uniform and adjusted values is used after each iteration, which results in giving more weight to the adjusted rule type selection probabilities as the number of iterations increases. The adjusted rule type selection probabilities are used in subsequent iterations of operation 500.

In an operation 243, the argument type value selection probabilities are adjusted based on the computed rule performance measure determined for each entity rule type generated at each iteration of 238 similar to the process in operation 242 for the rule type selection probabilities. The argument type value selection probabilities are used in subsequent iterations of operation 506. For example, when an average of $0.2F_1$ has been generated when person is used as the pivot-element for entity rule type 1, an average of $0.1F_1$ has been generated when singular proper noun is used as the pivot-element for entity rule type 1, and an average of $0.1F_1$ has been generated when word is used as the pivot-element for entity rule type 1, the pivot-element probabilities for entity rule type 1 may be updated as 0.5 when person is used as the pivot-element for entity rule type 1, as 0.25 when singular proper noun is used as the pivot-element for entity rule type 1, and as 0.25 when word is used as the pivot-element for entity rule type 1.

Similarly, when an average of $0.2F_1$ has been generated when left is used as the direction for entity rule type 2, and an average of $0.5F_1$ has been generated when right is used as the direction for entity rule type 2, the direction probabilities for entity rule type 2 may be updated as 0.286 when left is used as the direction for entity rule type 2, and as 0.714 when right is used as the direction for entity rule type 2. The update is performed for each type of rule and each argument type.

In operation 244, a determination is made concerning whether or not there is another annotated sentence to process. When the determination is that there is another annotated sentence to process, processing continues in operation 222 to select a next annotated sentence from the annotated documents 124. When the determination is that there is not another annotated sentence to process, processing continues in an operation 246 to generate relationship rules. Parameter type value selection probabilities may be reinitialized before processing continues in operation 246.

Similar to operation 222, in operation 246, an annotated sentence is selected from a document of the annotated documents 124. Similar to operation 224, in an operation 248, the one or more feature extraction algorithms 126 indicated in operation 204 are applied to the selected annotated sentence. Similar to operation 226, in an operation 250, feature information extracted from the sentence is output.

Similar to operation 228, in an operation 252, the argument type value selection probabilities are adjusted based on sentences. Similar to operation 230, in an operation 254, training set documents are selected from the annotated documents 124. Similar to operation 232, in an operation 256, a relationship rule instance is generated. As an example, the relationship rule instance may be generated using the example operations described with reference to FIG. 5 using the relationship rules indicated in operation 216 instead of the entity rules indicated in operation 214.

As an example, the selected annotated sentence is "Unlike many of his peers, Tom Cruise can emote well", and the rule is designed to learn "actor" as an entity. In this sentence, the annotation marks "Tom Cruise" as the actor. After feature extraction algorithms are executed on the sentence, "Tom Cruise" is recognized as a proper noun and a person and POS tags are generated for each word in the sentence. An entity rule type is selected randomly using either a uniform probability or a biased discrete distribution as described with reference to operation 242. After choosing the entity rule type for the sentence argument type values are selected based on the selected entity rule type to define a rule instance.

Assuming that rule type number 1 of Table I is selected, this rule type has three parameters. To extract "Tom Cruise" out of the sentence, "person", "proper noun" or a word can be extracted for pivot-element (p0). For example, C_CONCEPT: _c(NNP) extracts Tom Cruise out of this sentence (among many other things). The choice of "person", "proper noun" or a word is selected randomly using either a uniform probability or a biased discrete distribution as described with reference to operation 243. Assuming pivot-element (p0) is selected to be "person", the second parameter, direction, is a binary parameter. If the direction equals 1, the left of the entity is the focus; otherwise, the right of the entity is the focus. The choice between left or right is made randomly using either a uniform probability or a biased discrete distribution as described with reference to operation 243. Assuming the direction is selected to be right, the third parameter, context-element (p1), is chosen. Assuming the parameter is chosen to be a "verb", the first verb to the right of the entity is "emote". The parameter is the phrase with the first occurrence of the context-element (p1). For our example sentence, this corresponds to "can emote". Based on these random selections, the final rule generated is C_CONCEPT: _c{person} can emote.

Referring to FIG. 2*c*, processing continues in an operation 258. Similar to operation 234, in operation 258, a determination is made concerning whether or not the generated rule instance was generated previously for a different annotated sentence. When the generated rule instance was generated previously, processing continues in an operation 264. When the generated rule instance was not generated previously, processing continues in an operation 260.

Similar to operation 236, in operation 260, the generated rule instance is run against the selected training set documents to identify text that matches the generated rule as understood by a person of skill in the art. Similar to operation 238, in an operation 262, a rule performance measure is computed.

Similar to operation 240, in operation 264, a determination is made concerning whether or not to generate another rule instance based on a comparison between a number of iterations of operation 256 for the selected annotated sentence and a value of N. For illustration, when the number of iterations of operation 256 for the selected annotated sentence is less than or equal to the value of N, the determination is to generate another rule instance. When the determination is to generate another rule instance, processing continues in operation 256 to generate and evaluate another entity rule instance. When the determination is not to generate another rule instance, processing continues in an operation 266.

Similar to operation 242, in operation 266, the rule type selection probabilities are adjusted based on the computed rule performance measure determined for each relationship rule type generated at each iteration of 262. Similar to operation 243, in an operation 267, the argument type value selection probabilities are adjusted based on the computed rule performance measure determined for each relationship rule type generated at each iteration of 262.

Similar to operation 244, in operation 268, a determination is made concerning whether or not there is another annotated sentence to process. When the determination is that there is another annotated sentence to process, processing continues in operation 246 to select a next annotated sentence from the annotated documents 124. When the determination is that there is not another annotated sentence to process, processing continues in an operation 270.

In an example embodiment, the selection of the K training set documents in operation 254 may be restricted to documents that include a specific word that may be included as part of generation of a relationship rule instance. For example, operation 254 may be performed after operation 256 so that if the rule says "C_Concept: _c{person} exaggerates", documents that do not include the word exaggerate are not selected because it is known that the documents do not have any match for this rule. The accuracy measure may be extrapolated based on a percentage of documents without the word to generate a more accurate measure of rule performance. An inverted index of annotated documents 124 may be generated so that the selection of the K training set documents can be made in a similar amount of time for each iteration.

In an operation 270, the entity rule instances are sorted based on the computed rule performance measure for each entity rule instance. For example, the computed rule performance measure for each entity rule instance is ranked in decreasing order so that rule instances having a highest value for the computed rule performance measure are sorted to a top of a rule instance list, array, or other data structure as understood by a person of skill in the art. Of course, the entity rule instances may be sorted in other manners depending on how the computed rule performance measure measures performance. In an operation 272, M best performing entity rule instances are selected from the sorted entity rule instances.

In an operation 274, dominated rules are removed from the selected M best performing entity rule instances. For example, given two "actor" rules: 1) _c{person} emoted well and 2) _c{person} emoted well as person, rule 2 is redundant if rule 1 captures all of the information that rule 2 does, and rule 1 does not have any additional false positives. In such a case, removing rule 2 from rules model 128 does not have a detrimental effect.

From multi-objective optimization, a solution is non-dominated if there is no other solution that is better than it in each of the objective functions. When considering the selected M best performing entity rule instances, each true positive and each false positive in the training set is considered as a new objective. Rule A dominates another Rule B if rule A's true positive set is a superset of rule B's true positive set, and rule A's false positive set is a subset of rule B's false positive set. Such dominated rules may be removed from the selected M best performing entity rule instances. Kung's algorithm, as described in F. L. &. F. P. T. Kung, "On Finding the Maxima of a Set of Vectors," *Journal of the ACM*, pp. 469-476, 1975, may be used. Other algorithms may be used.

As an example of the meaning of non-dominated sets, given sets A, B, and C as the results of three different rules, their true positives (TP) and false positive (FP) are:

A TP=[a b c]

A FP=[x y z]

B TP=[b c]

B FP=[w x y z]

C TP=[a d]

C FP=[x y z]

Set A has all of the TP results as B, and B has no extra TP that are not included in A. A also has one extra TP result. This means that A dominates B in TP, but FP values are also evaluated. All of A's FP are within B. B has one extra FP result that is not included in A's FP list. This means A dominates B, and B can be removed from the final rule set.

Set C has a TP result 'd' that is not in A. This means that A does not dominate C, because C brings in a good result, 'd'. C remains in the final rule set because it is a non-dominated solution.

In an operation 276, entity rule instances are selected for rules model 128. For example, to generate the entity rule instances for rules model 128, an optimization routine, $U(m)=\max_m F_1(m)-\alpha(\text{Complexity}(m))$, may be solved where $F_1(m)$ is the computed rule performance measure for a rule instance m, a is the complexity parameter indicated in operation 212, and Complexity(m) is a number of entity rules currently included in rules model 128.

As a first example optimization routine, an entity rule instance set may be initialized to an empty set. A rule instance may be added to the entity rule instance set when U(m) improves after adding the rule instance. Otherwise, a next rule instance is selected from the sorted rule instances defined after removing the dominated rules. The next rule instance may be added to the entity rule instance set when U(m) improves after adding the next rule instance, and so on until the sorted rule instances defined after removing the dominated rules are exhausted. After each rule instance is added, Complexity(m) may be incremented by one.

As a second example optimization routine, an evolutionary algorithm may be used. For example, a genetic algorithm as described in D. Goldberg, Genetic Algorithms in Search, Optimization and Machine Learning, Reading, Mass.: Addison-Wesley Professional, 1989 may be used. The genetic algorithm uses a binary representation equal in length to a total number of rule instances being searched as its chromosome. An R-length binary chromosome is decoded as follows: a j-th entity rule instance is included in rules model 128 if and only if the j-th chromosome member is one. Example parameters for the genetic algorithm are summarized in Table V:

TABLE V

| Parameter | Value |
|---|---|
| Generations | number of entity rules currently included in rules model 128 |
| Selection Operator | Tournament Selection |
| Population Size | Half the number of entity rules currently included in rules model 128 |

Similar to operation 270, in an operation 278, the relationship rule instances are sorted based on the computed rule performance measure for each rule instance. Similar to operation 272, in an operation 280, M best performing relationship rule instances are selected from the sorted relationship rule instances. Similar to operation 274, in an operation 282, dominated rules are removed from the selected M best performing relationship rule instances. Similar to operation 276, in an operation 284, relationship rule instances are selected for rules model 128.

In an operation 286, rules model 128 is output. Rules model 128 may be output by being stored on one or more devices and/or on computer-readable medium 108 in a variety of formats as understood by a person of skill in the art. Rules model 128 further may be output to display 116, to printer 18, etc.

Figure 6:
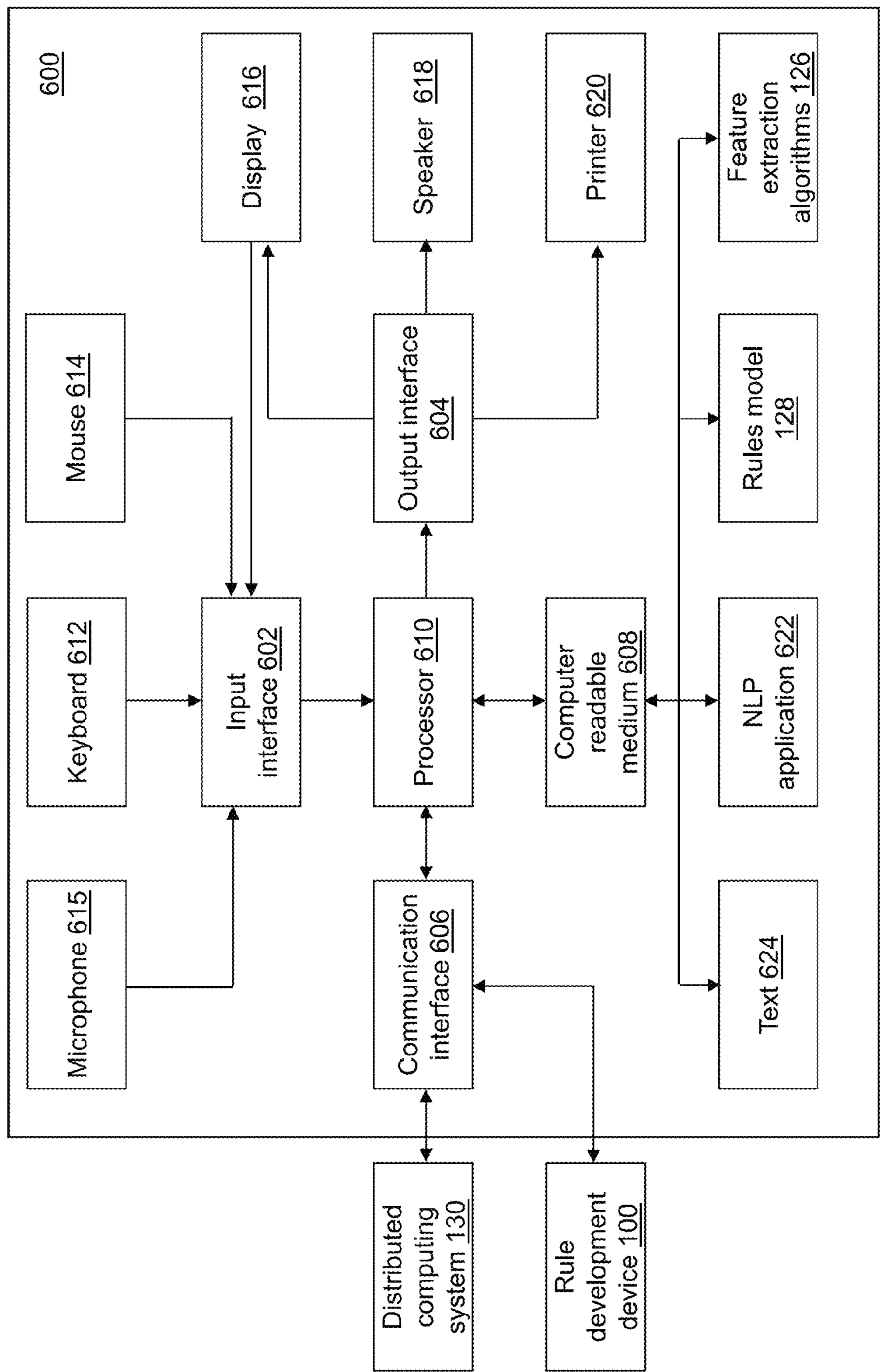
FIG. 6 depicts a block diagram of a natural language processing (NLP) device in accordance with an illustrative embodiment.

Referring to FIG. 6, a block diagram of an NLP device 600 is shown in accordance with an example embodiment. NLP device 600 may include a second input interface 602, a second output interface 604, a second communication interface 606, a second computer-readable medium 608, a second processor 610, a second keyboard 612, a second mouse 614, a second microphone 615, a second display 616, a second speaker 618, a second printer 620, an NLP application 622, text 624, the one or more feature extraction algorithms 126, and rules model 128. NLP application 622 extracts entities and relationships between the entities from text 624 based on taxonomy 125 and application of the one or more feature extraction algorithms 126 and rules model 128 to text 624. Fewer, different, and additional components may be incorporated into NLP device 600.

Second input interface 602 provides the same or similar functionality as that described with reference to input interface 102 of rule development device 100 though referring to NLP device 600. Second output interface 604 provides the same or similar functionality as that described with reference to output interface 104 of rule development device 100 though referring to NLP device 600. Second communication interface 606 provides the same or similar functionality as that described with reference to communication interface 106 of rule development device 100 though referring to NLP device 600. Data and messages may be transferred between NLP device 600 and distributed computing system 130 and/or rule development device 100 using second communication interface 606. Second computer-readable medium 608 provides the same or similar functionality as that described with reference to computer-readable medium 108 of rule development device 100 though referring to NLP device 600. Second processor 610 provides the same or similar functionality as that described with reference to processor 110 of rule development device 100 though referring to NLP device 600.

Text 624 may be any text from which the entities and relationships between the entities are to be identified and extracted.

NLP application 622 performs operations associated with extracting entities and relationships between the entities from text 624. Some or all of the operations described herein may be embodied in NLP application 622. The operations may be implemented using hardware, firmware, software, or any combination of these methods. Referring to the example embodiment of FIG. 6, NLP application 622 is implemented in software (comprised of computer-readable and/or computer-executable instructions) stored in second computer-readable medium 608 and accessible by second processor 610 for execution of the instructions that embody the operations of NLP application 622. NLP application 622 may be written using one or more programming languages, assembly languages, scripting languages, etc. NLP application 622 may be implemented as a Web application. Rule development application 122 and NLP application 622 may be integrated into a single application or may be separate applications.

Figure 7:
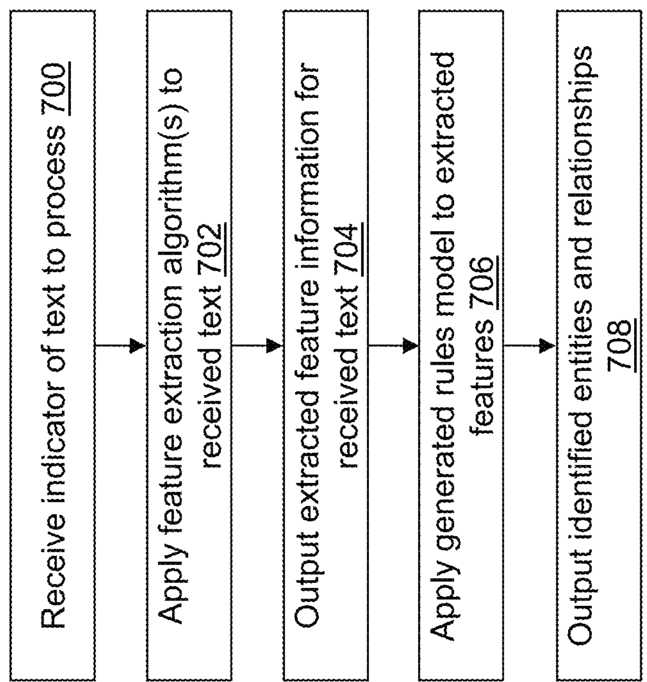
FIG. 7 depicts a flow diagram illustrating examples of operations performed by the NLP device of FIG. 6 in accordance with an illustrative embodiment.

Referring to FIG. 7, example operations associated with NLP application 622 are described. Additional, fewer, or different operations may be performed depending on the embodiment. The order of presentation of the operations of FIG. 7 is not intended to be limiting. Although some of the operational flows are presented in sequence, the various operations may be performed in various repetitions, concurrently (in parallel, for example, using threads), and/or in other orders than those that are illustrated.

In an operation 700, a twelfth indicator is received that indicates text 624 to process. For example, the twelfth indicator indicates a location of text 624. As an example, the twelfth indicator may be received by NLP application 622 after selection from a user interface window or after entry by a user into a user interface window.

In an operation 702, the one or more feature extraction algorithms 126 are applied to text 624. In an operation 704, feature information extracted from text 624 is output.

In an operation 706, rules model 128 is applied to the output feature information extracted from text 624 to identify entities and relationships between the entities. For example, text 624 is an entire document of text. If there are any rules matches, the matches are extracted from text 624.

In an operation 708, the identify entities and relationships are output. The identify entities and relationships may be output by being stored on one or more devices and/or on second computer-readable medium 608 in a variety of formats as understood by a person of skill in the art. The identify entities and relationships further may be output to second display 616, to second printer 618, etc.

Figure 8:
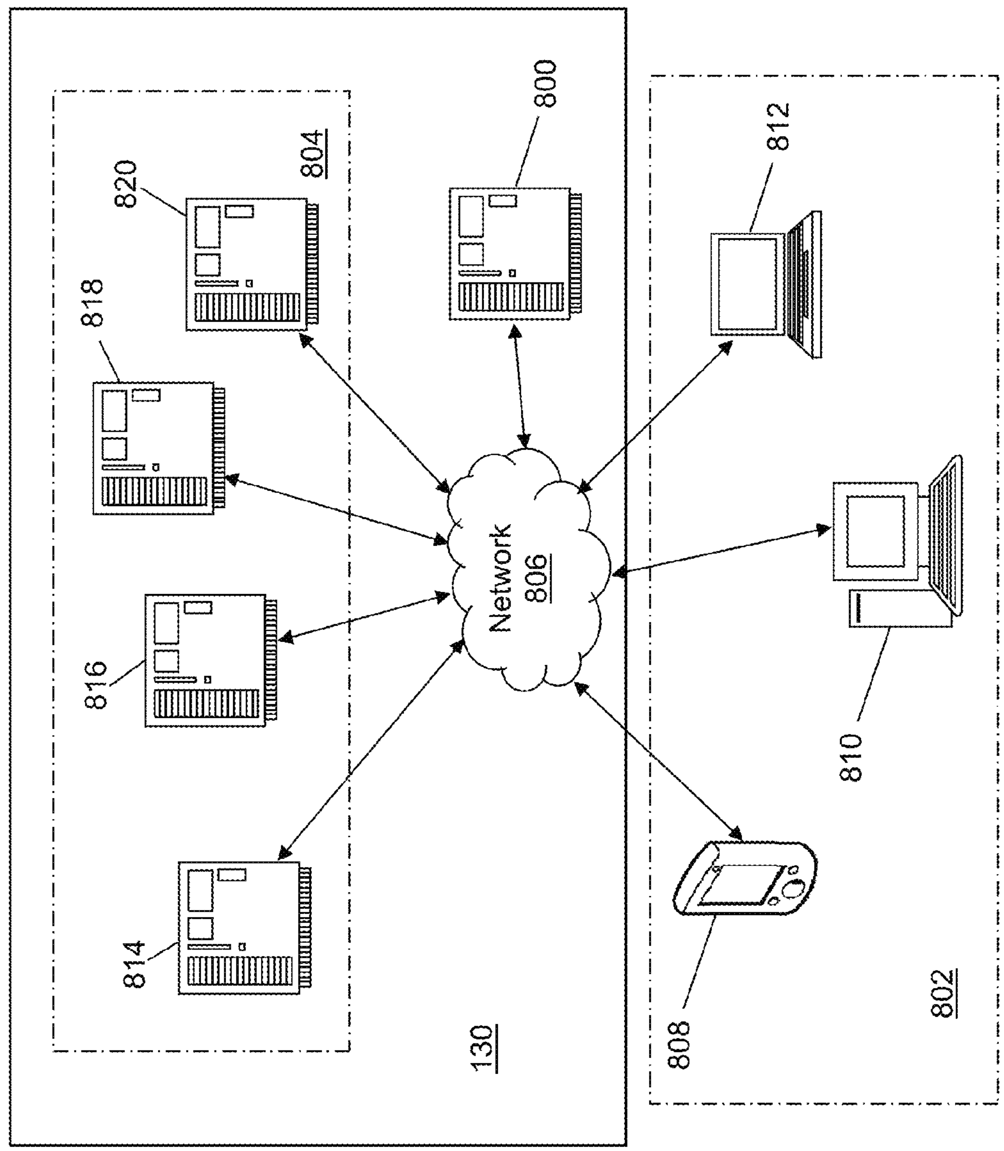
FIG. 8 depicts a block diagram of a distributed computing system and a rule development system in accordance with an illustrative embodiment.

Referring to FIG. 8, a block diagram of distributed computing system 130 is shown in accordance with an illustrative embodiment. In an illustrative embodiment, distributed computing system 130 may include a distributed control device 800, distributed systems 804, and a network 806. Distributed systems 804 may store a subset of annotated documents 124. Distributed computing system 130 may communicate with rule development system 802 and distributed systems 804 through network 806 and coordinate and control access by rule development system 802 to annotated documents 124 stored by distributed systems 804.

One or more components of distributed computing system 130 and of rule development system 802 may support multithreading, as understood by a person of skill in the art.

The components of distributed computing system 130 and of rule development system 802 may be located in a single room or adjacent rooms, in a single facility, and/or may be distributed geographically from one another. Each of distributed systems 804, rule development system 802, and distributed control device 800 may be composed of one or more discrete devices.

Network 806 may include one or more networks of the same or different types. Network 806 can be any type of wired and/or wireless public or private network including a cellular network, a local area network, a wide area network such as the Internet, etc. Network 806 further may comprise sub-networks and include any number of devices.

Rule development system 802 can include any number and type of computing devices that may be organized into subnets. Rule development device 100 is an example computing device of rule development system 802. The computing devices of rule development system 802 send and receive communications through network 806 to/from another of the one or more computing devices of rule development system 802, to/from distributed systems 804, and/or to/from distributed control device 800. The one or more computing devices of rule development system 802 may include computers of any form factor such as a smart phone 808, a desktop 810, a laptop 812, a personal digital assistant, an integrated messaging device, a tablet computer, etc. The one or more computing devices of rule development system 802 may communicate using various transmission media that may be wired and/or wireless as understood by those skilled in the art.

For illustration, FIG. 8 represents distributed systems 804 with a first server computer 814, a second server computer 816, a third server computer 818, and a fourth server computer 820. Distributed systems 804 can include any number and form factor of computing devices that may be organized into subnets. The computing devices of distributed systems 804 send and receive communications through network 806 to/from another of the one or more computing devices of distributed systems 804, to/from distributed control device 800, and/or to/from rule development system 802. The one or more computing devices of distributed systems 804 may communicate using various transmission media that may be wired and/or wireless as understood by those skilled in the art.

In the illustrative embodiment, distributed control device 800 is represented as a server computing device though distributed control device 800 may include one or more computing devices of any form factor that may be organized into subnets. Distributed control device 800 sends and receives communications through network 806 to/from distributed systems 804 and/or to/from rule development system 802. Distributed control device 800 may communicate using various transmission media that may be wired and/or wireless as understood by those skilled in the art.

Distributed computing system 130 may be implemented as a grid of computers with each computing device of distributed computing system 130 storing a portion of annotated documents 124 in a cube, as understood by a person of skill in the art. Distributed computing system 130 may be implemented as a multi-node Hadoop® cluster, as understood by a person of skill in the art. Distributed computing system 130 may use cloud computing technologies, which support on-demand network access to a shared pool of configurable computing resources (e.g., networks, servers, storage, applications and services) that can be rapidly provisioned and released with minimal management effort or service provider interaction. Distributed computing system 130 may use SAS® High Performance Analytics server. Distributed computing system 130 may use the SAS LASR™ Analytic Server to deliver statistical modeling and machine learning capabilities in a highly interactive programming environment, which may enable multiple users to concurrently manage data, transform variables, perform exploratory analysis, and build and compare models. Distributed computing system 130 may use SAS In-Memory Statistics for Hadoop® to read big data once and analyze it several times by persisting it in-memory. Some systems may be of other types and configurations.

The various operations described with reference to FIGS. **2*a*-2*c* and 5 provide a process for automatically providing rapid domain adaptability, such as to social media domain, a patent domain, a bio-medical domain, a sentiment domain, and a security domain with minimal additional software infrastructure development. Rule model 128 may be used to provide fraud detection, threat detection, drug side effects detection, product defects, etc. depending on the domain selected for use. The process is easy to use without requiring strong NLP skills. Additionally, the process is parallelizable to leverage the compute power of distributed computing system 130** without re-engineering.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a processor of a computing device cause the computing device to:

(a) select annotated text from a first document of a plurality of annotated documents;

(b) select an entity rule type from a plurality of entity rule types;

(c) identify an argument of the selected entity rule type;

(d) randomly select a value for the identified argument based on the selected annotated text to generate a rule instance;

(e) apply the generated rule instance to remaining documents of the plurality of annotated documents;

(f) compute a rule performance measure based on application of the generated rule instance;

(g) store the generated rule instance and the computed rule performance measure;

(h) repeat (a) to (g) with each remaining document of the plurality of annotated documents as the first document to define a plurality of rules;

select a number of rules from the defined plurality of rules based on the stored, computed rule performance measure; and store each rule of the selected number of rules to the non-transitory computer-readable medium as a basis for a rules model that automatically identifies an entity or a relationship in non-annotated text.

2. The non-transitory computer-readable medium of claim 1, wherein the entity rule type is selected randomly from the plurality of entity rule types.

3. The non-transitory computer-readable medium of claim 2, wherein a probability of selecting the entity rule type is determined using the computed rule performance measure.

4. The non-transitory computer-readable medium of claim 1, wherein a probability of selecting the value for the identified argument is determined using the computed rule performance measure.

5. The non-transitory computer-readable medium of claim 1, wherein a probability of selecting the value for the identified argument is determined using a probability value defined as an input before selecting the annotated text.

6. The non-transitory computer-readable medium of claim 5, wherein the probability of selecting the value for the identified argument is determined using the computed rule performance measure after a specified portion of the plurality of annotated documents is processed in Q.

7. The non-transitory computer-readable medium of claim 1, wherein randomly selecting the value uses a uniform statistical distribution.

8. The non-transitory computer-readable medium of claim 1, wherein a probability of selecting the value for the identified argument for the selected entity rule type is updated using the computed rule performance measure after each computation of the rule performance measure.

9. The non-transitory computer-readable medium of claim 8, wherein the entity rule type is selected randomly from the plurality of entity rule types.

10. The non-transitory computer-readable medium of claim 9, wherein a probability of selecting the entity rule type is updated using the computed rule performance measure after each computation of the rule performance measure.

11. The non-transitory computer-readable medium of claim 1, wherein the computer-readable instructions further cause the computing device to:

select second annotated text from the first document of the plurality of annotated documents;

select a relationship rule type from a plurality of relationship rule types;

identify an argument of the selected relationship rule type;

randomly select a second value for the identified argument of the selected relationship rule type based on the selected second annotated text to generate a relationship rule instance;

apply the generated relationship rule instance to the remaining documents of the plurality of annotated documents;

compute a relationship rule performance measure based on application of the generated relationship rule instance; and store the generated relationship rule instance and the computed relationship rule performance measure.

12. The non-transitory computer-readable medium of claim 11, wherein the computer-readable instructions further cause the computing device to repeat with each remaining document of the plurality of annotated documents as the first document the selecting of the second annotated text, the selecting of the relationship rule type, the identifying of the argument of the selected relationship rule type, the random selection of the second value for the identified argument of the selected relationship rule type, the application of the generated relationship rule instance to the remaining documents of the plurality of annotated documents, the computation of the relationship rule performance measure, and the storing of the relationship rule instance and the computed relationship rule performance measure to define a plurality of relationship rules.

13. The non-transitory computer-readable medium of claim 12, wherein the computer-readable instructions further cause the computing device to select a second number of rules from the defined plurality of relationship rules based on the stored, computed relationship rule performance measure and store each rule of the selected second number of rules to the non-transitory computer-readable medium as a further basis for the rules model that automatically identifies the entity or the relationship in non-annotated text.

14. The non-transitory computer-readable medium of claim 1, wherein the computer-readable instructions further cause the computing device to sort the selected number of rules and to select entity rule instances from the sorted, selected number of rules to define the rules model by solving an optimization routine with the computed rule performance measure of each of the sorted, selected number of rules.

15. The non-transitory computer-readable medium of claim 14, wherein a rule instance of the sorted, selected number of rules is added to the rules model when U(m) improves after adding the rule instance to a computation of U(m), wherein $U(m)=\max_m F_1(m)-\alpha(\text{Complexity}(m))$, where m is the rule instance of the sorted, defined plurality of rules, $F_1(m)$ is the computed rule performance measure for the rule instance m, a is a complexity parameter defined as an input, and Complexity(m) is a number of entity rules currently included in the rules model.

16. The non-transitory computer-readable medium of claim 15, wherein each rule instance is evaluated in the computation of U(m) in the sorted order.

17. The non-transitory computer-readable medium of claim 14, wherein the computer-readable instructions further cause the computing device to remove dominated rules from the selected number of rules before selecting the entity rule instances from the sorted, selected number of rules.

18. The non-transitory computer-readable medium of claim 14, wherein the optimization routine is a genetic algorithm.

19. The non-transitory computer-readable medium of claim 1, wherein identifying the argument of the selected entity rule type and randomly selecting the value for the identified argument is repeated for each argument defined for the selected entity rule type in order to generate the rule instance.

20. A computing device comprising:

a processor; and a non-transitory computer-readable medium operably coupled to the processor, the computer-readable medium having computer-readable instructions stored thereon that, when executed by the processor, cause the computing device to (a) select annotated text from a first document of a plurality of annotated documents;

(b) select an entity rule type from a plurality of entity rule types;

(c) identify an argument of the selected entity rule type;

(d) randomly select a value for the identified argument based on the selected annotated text to generate a rule instance;

(e) apply the generated rule instance to remaining documents of the plurality of annotated documents;

(f) compute a rule performance measure based on application of the generated rule instance;

(g) store the generated rule instance and the computed rule performance measure;

(h) repeat (a) to (g) with each remaining document of the plurality of annotated documents as the first document to define a plurality of rules;

select a number of rules from the defined plurality of rules based on the stored, computed rule performance measure; and store each rule of the selected number of rules to the non-transitory computer-readable medium as a basis for a rules model that automatically identifies an entity or a relationship in non-annotated text.

21. The computing device of claim 20, wherein the entity rule type is selected randomly from the plurality of entity rule types.

22. The computing device of claim 21, wherein a probability of selecting the entity rule type is determined using the computed rule performance measure.

23. The computing device of claim 20, wherein a probability of selecting the value for the identified argument is determined using a probability value defined as an input before selecting the annotated text.

24. The computing device of claim 23, wherein the probability of selecting the value for the identified argument is determined using the computed rule performance measure after a specified portion of the plurality of annotated documents is processed.

25. A method of defining a rule for natural language processing of text, the method comprising:

(a) selecting, by a computing device, annotated text from a first document of a plurality of annotated documents;

(b) selecting, by the computing device, an entity rule type from a plurality of entity rule types;

(c) identifying, by the computing device, an argument of the selected entity rule type;

(d) randomly selecting, by the computing device, a value for the identified argument based on the selected annotated text to generate a rule instance;

(e) applying, by the computing device, the generated rule instance to remaining documents of the plurality of annotated documents;

(f) computing, by the computing device, a rule performance measure based on application of the generated rule instance;

(g) storing, by the computing device, the generated rule instance and the computed rule performance measure;

(h) repeating (a) to (g), by the computing device, with each remaining document of the plurality of annotated documents as the first document to define a plurality of rules;

selecting, by the computing device, a number of rules from the defined plurality of rules based on the stored, computed rule performance measure; and storing, by the computing device, each rule of the selected number of rules to the non-transitory computer-readable medium as a basis for a rules model that automatically identifies an entity or a relationship in non-annotated text.

26. The method of claim 25, wherein the entity rule type is selected randomly from the plurality of entity rule types.

27. The method of claim 26, wherein a probability of selecting the entity rule type is determined using the computed rule performance measure.

28. The method of claim 25, wherein a probability of selecting the value for the identified argument is determined using a probability value defined as an input before selecting the annotated text.

29. The method of claim 28, wherein the probability of selecting the value for the identified argument is determined using the computed rule performance measure after a specified portion of the plurality of annotated documents is processed.

30. The non-transitory computer-readable medium of claim 13, wherein the computer-readable instructions further cause the computing device to sort the selected second number of rules and to select entity rule instances from the sorted, selected second number of rules to define the rules model by solving an optimization routine with the computed relationship rule performance measure of each of the sorted, selected second number of rules.

* * * * *

UNITED STATES PATENT AND TRADEMARK OFFICE

CERTIFICATE OF CORRECTION

PATENT NO. : 9,460,071 B2
APPLICATION NO. : 14/692333
DATED : October 4, 2016
INVENTOR(S) : Avasarala et al.

It is certified that error appears in the above-identified patent and that said Letters Patent is hereby corrected as shown below:

In the Specification

Column 7, Line 66:
Delete "parameter, a, is received" and replace with --parameter, $\alpha$, is received--

Column 7, Line 67:
Delete "value of a used" and replace with --value of $\alpha$ used--

Column 8, Line 5:
Delete "complexity parameter, a," and replace with --complexity parameter, $\alpha$,--

Column 8, Line 7:
Delete "a may be defined" and replace with --$\alpha$ may be defined--

In the Claims

Claim 6, Column 23, Line 35:
Delete "processed in Q" and replace with --processed in (h)--

Claim 15, Column 24, Line 44:
Delete "a is a complexity parameter" and replace with --$\alpha$ is a complexity parameter--

Signed and Sealed this
Twenty-seventh Day of June, 2017

Joseph Matal

Joseph Matal
*Performing the Functions and Duties of the*
*Under Secretary of Commerce for Intellectual Property and*
*Director of the United States Patent and Trademark Office*